United States Patent [19]

Evans

[11] 4,081,255
[45] Mar. 28, 1978

[54] SYSTEM FOR FILTERING STACK GASES

[76] Inventor: Gary L. Evans, Rt. 1, Box 139A, Junction City, Ark. 71749

[21] Appl. No.: 715,129

[22] Filed: Aug. 16, 1976

[51] Int. Cl.² ............................................ B01D 47/00
[52] U.S. Cl. ...................................... 55/230; 55/242; 55/273; 55/308; 55/309; 55/294; 55/356; 55/481; 55/493; 110/119
[58] Field of Search .................... 55/96, 242, 273, 230, 55/282–284, 286, 293, 294, 301, 303, 308, 309, 312–314, 356, 422, 481, 493; 110/119

[56] References Cited

U.S. PATENT DOCUMENTS

| | | | |
|---|---|---|---|
| 1,425,473 | 8/1922 | Hatcher | 110/119 |
| 1,895,618 | 1/1933 | Fedeler | 55/242 |
| 1,907,197 | 5/1933 | Dorfan | 55/273 |
| 2,599,139 | 6/1952 | Stevenson | 55/242 |
| 2,997,132 | 8/1961 | Allander et al. | 55/242 |
| 3,615,248 | 10/1971 | Holler, Jr. | 55/242 |
| 3,686,832 | 8/1972 | Hori et al. | 55/242 |

*Primary Examiner*—Bernard Nozick
*Attorney, Agent, or Firm*—Laney, Dougherty & Hessin

[57] ABSTRACT

A system for filtering stack gases and the like comprising an in-feed exhaust duct and a pair of filter vat cleaners disposed on opposite sides of the in-feed exhaust duct and horizontally spaced therefrom. A track assembly extends horizontally above the in-feed exhaust duct and filter vat cleaners, and a carriage car carrying two horizontally spaced filter containers is mounted rollably on the track assembly for reciprocating movement therealong to alternately position one of the filter containers over the exhaust duct, and then the other over one of the two filter vat cleaners, in alternating sequence. Coupling means is provided for coupling the filter containers with the respective filter vat cleaners and the exhaust duct. An out-feed exhaust duct is positioned over the track assembly and carriage and is vertically aligned with the in-feed exhaust duct. Coupling means is provided for coupling the discharge exhaust duct to whichever of the filter containers is located therebelow, and in alignment with the in-feed exhaust duct. Means is provided for bypassing exhaust gases from the in-feed exhaust duct to the discharge exhaust duct when no filter container is positioned therebetween.

29 Claims, 11 Drawing Figures

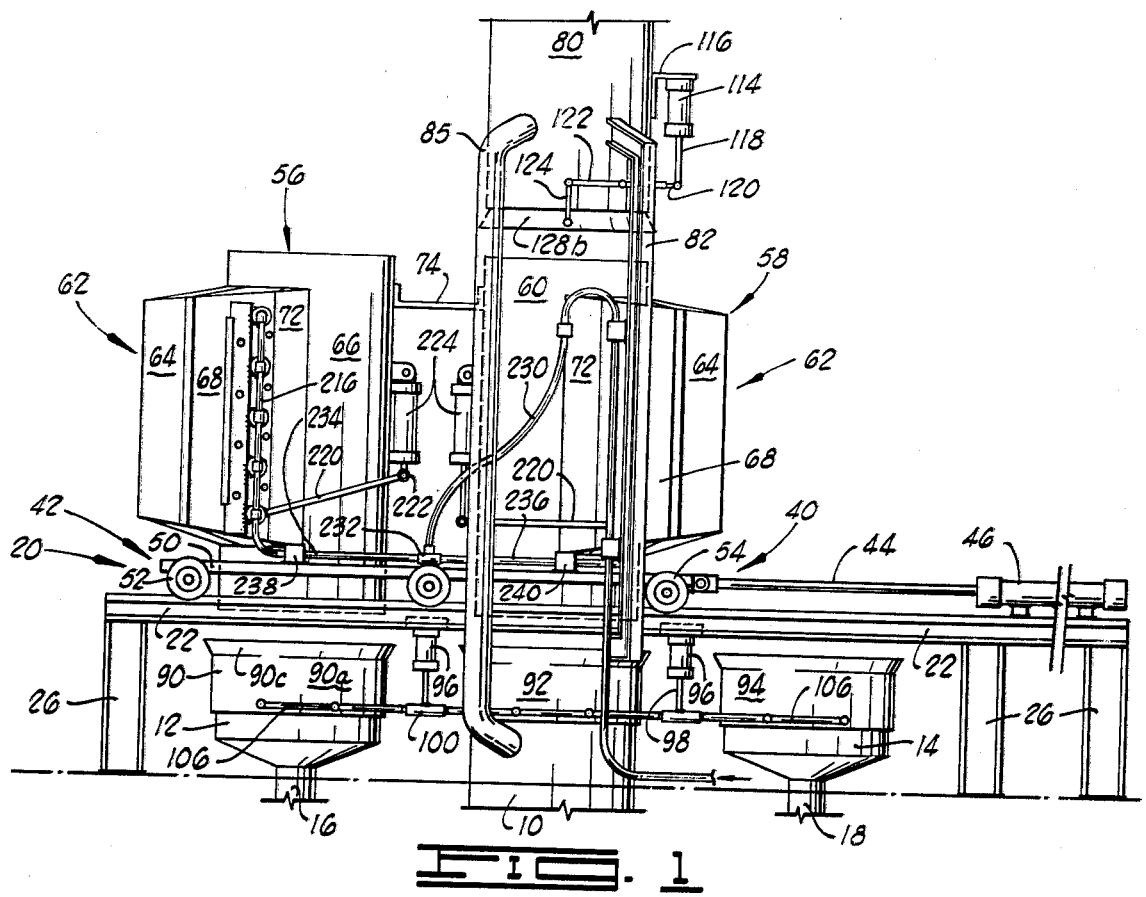

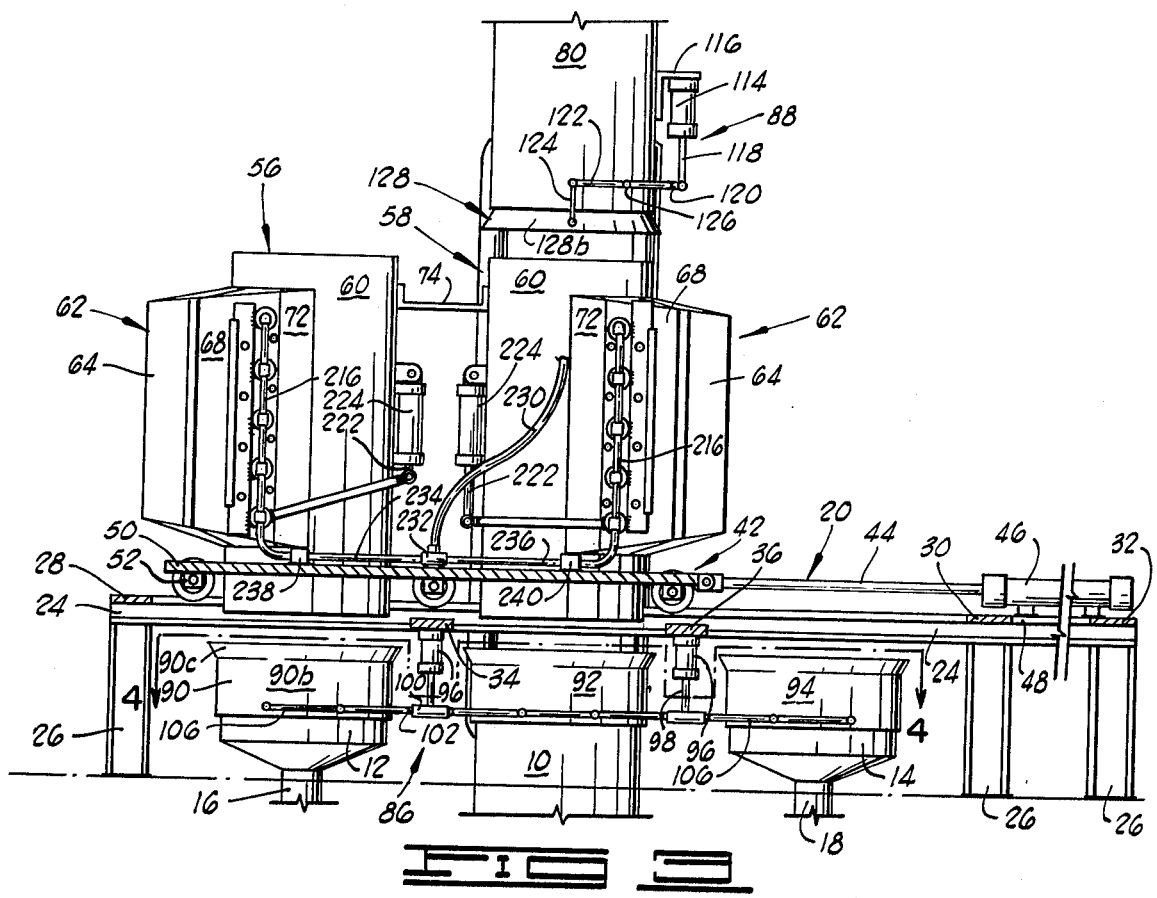
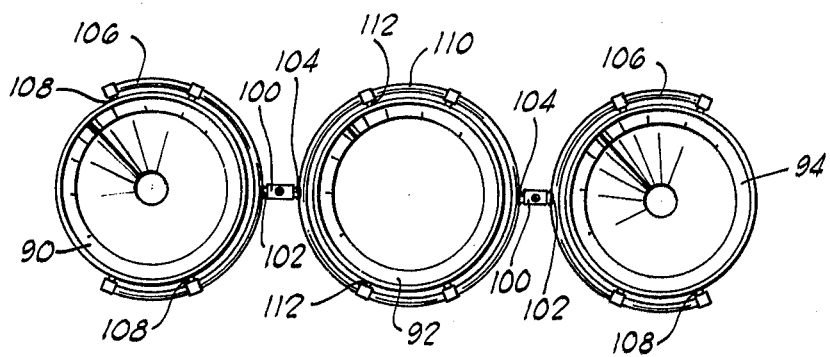

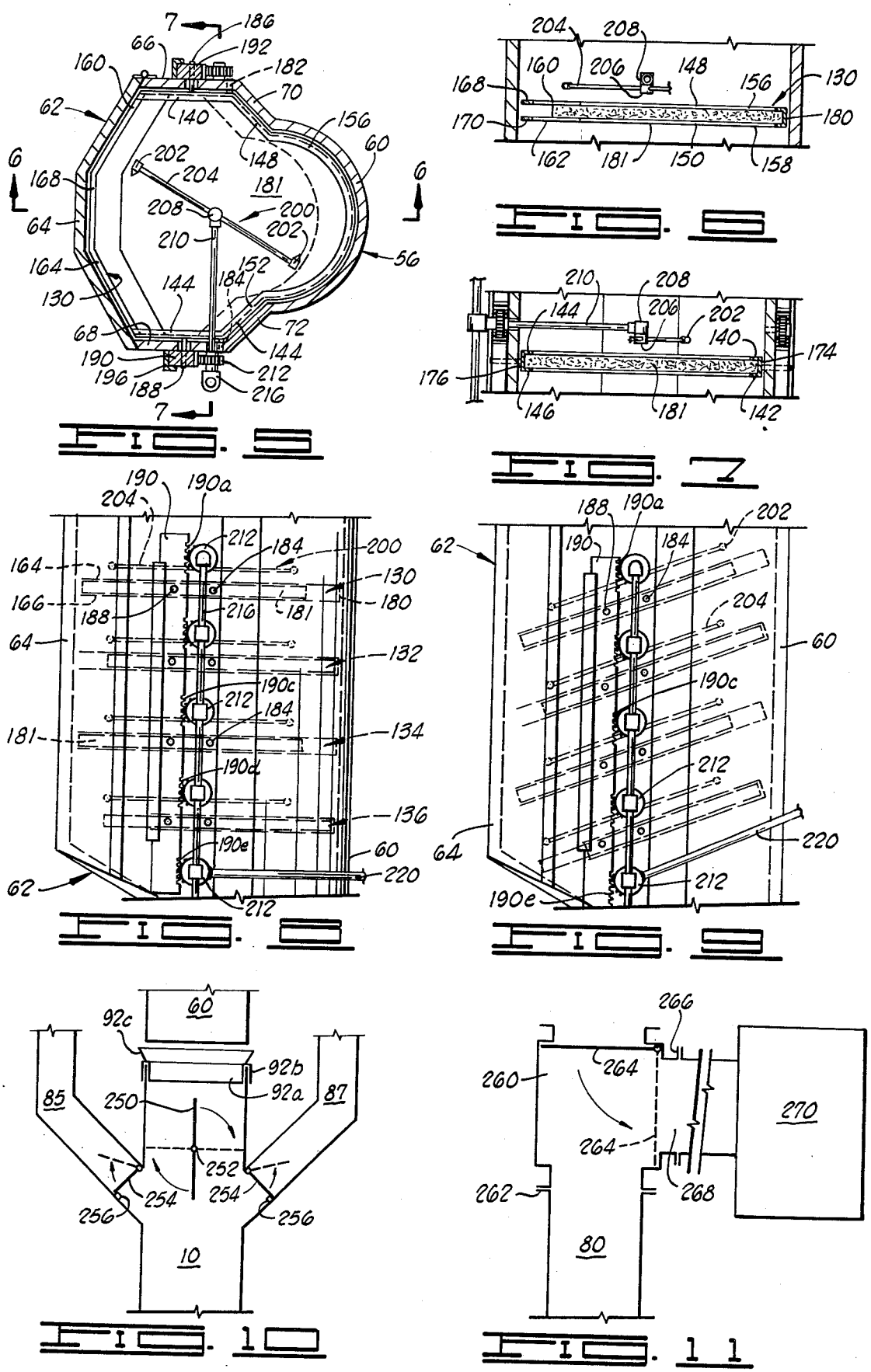

SYSTEM FOR FILTERING STACK GASES

BACKGROUND OF THE INVENTION

1. Field of the Invention

This invention relates to filtering assemblies for filtering polluted gases, and more particularly, to filter assemblies for automatically and semi-continuously filtering the gases discharged from stacks and other industrial outlets in a manner to alleviate and prevent pollution of the atmosphere.

2. Brief Description of the Prior Art

Various filter systems have heretofore been proposed, with increasing frequency of late, for removing pollutants from stack gases and other industrial gas discharge points so that the pollution of the atmosphere and surrounding environment with solid pollutants as well as gaseous pollutants may be alleviated or reduced. An increasing consciousness of the desirability of having clean and pure air to enhance the health and enjoyment of all persons has resulted in a vast increase in the attention which has been paid in the last 20 years to the purification of stack gases and other industrial wastes with a view toward cleaning up the waste to prevent random discharge of materials which are noxious, or at least unpleasant or disagreeable to human beings and to the flora and fauna surrounding such industrial installations. The types of equipment and apparatus which have been provided for scrubbing or cleaning stack gases have varied widely. Some types of devices undertake to remove particles of carbon and soot prior to discharge of the gases, and constitute various types of filters through which the gases are passed to discharge to the atmosphere.

In the devices which have been provided for filtering solid particles from stack gases and the like, it has generally been necessary to provide varying periods of down time on the stacks discharging the gases to permit the filters to be removed and cleaned, and then replaced, in order to function efficiently. This presents an undesirable aspect of such apparatus, since either the plant must be shut down, or the stack gases must be diverted to another point, or treated in some different manner, in order to accommodate the necessity to remove the filters for cleaning purposes.

Another characteristic which has suggested the need for further optimization of stack gas filtering systems is the bulk and complexity of such systems which have been provided in some instances. High capital investment costs have sometimes been charateristic of the systems to the point where industrialists are reluctant to install the systems until coerced to do so by government regulations or inspections, or by lawsuits filed by irate property owners in the vicinity of the offending facility.

BRIEF DESCRIPTION OF THE PRESENT INVENTION

The present invention provides an improved semi-automatic filter system for use in industrial facilities to provide semi-continuous, automatic filtering of stack gases discharged from stacks, exhaust ducts and the like in such facilities. The system of the invention is relatively simple mechanically, and is of relatively low cost construction, can be operated semi-automatically and with minimum operator attention, and functions effectively on a near continuous basis for removing pollutants from stack gases in an efficient manner.

Broadly described, the filtering system of the present invention comprises, in combination or conjunction with an exhaust duct or stack, hereinafter called the in-feed exhaust duct, a pair of filter vat cleaners which are disposed on opposite sides of the in-feed exhaust duct, and are horizontally spaced therefrom. A track assembly extends horizontally above the in-feed exhaust duct and filter vat cleaners. A carriage car carrying two horizontally spaced filter containers is mounted rollably on the track assembly for reciprocating movement therealong. This facilitates the alternate positioning of one of the filter containers over the exhaust duct, while the other of the filter containers is alternately positioned over one of the two filter vat cleaners. The alternating sequence of alignment of the filter containers over the filter vat cleaners permits one of them to undergo cleaning when the other is functioning to receive polluted stack gases from the in-feed exhaust duct to remove solid contaminants prior to permitting the stack gases to be passed out of a communicating discharge exhaust duct. Such discharge exhaust duct is located over, and in alignment with, the in-feed exhaust duct and the interpositioned filter container which is functioning for filtering purposes.

Coupling means is provided for coupling the filter containers with the respective filter vats used for cleaning the filters in the filter containers, and with the in-feed exhaust duct, at times when the respective filter containers are aligned with the respective exhaust duct or filter vat. A further coupling means is provided for coupling the discharge exhaust duct to whichever of the filter containers is located therebelow and in alignment with the infeed exhaust duct. Means is provided for bypassing exhaust or stack gases from the in-feed exhaust duct to the discharge exhaust duct when neither of the filter containers is positioned therebetween during a transitional phase of the operation of the filter system of the invention.

An important object of the invention is to provide a filter system for filtering stack gases and similar industrial discharge gases to remove solid particles therefrom on a semi-continuous, efficient basis.

A further object of the invention is to provide a filtering system which relatively simple in its mechanical construction, and requires little operator attention during operation of the system for removing pollutants from stack gases and the like on a semi-continuous basis.

A further and more specific object of the invention is to provide a filtering system which provides several filters located within novelly constructed filter containers, which filters can be very quickly and rapidly cleaned as the filters are alternately shifted between an operative filtering position over an exhaust duct or stack, and a cleaning position where they are located over a filter vat which is used, conjunctively with various strategically disposed water discharging nozzles, during the cleaning of the filter elements located in the filter housing.

Additional objects and advantages of the invention will become apparent as the following detailed description of a preferred embodiment of the invention is read in conjunction with the accompanying drawings which illustrate such preferred embodiment.

BRIEF DESCRIPTION OF THE DRAWINGS

FIG. 1 is a side elevation view of the front side of the filter system of the present invention as it appears in one operative position of the filter system.

FIG. 2 is a plan view of the filter system illustrated in FIG. 1.

FIG. 3 is a sectional view of the filter system of the present invention taken along line 3—3 of FIG. 2.

FIG. 4 is a sectional view taken along line 4—4 of FIG. 3.

FIG. 5 is a horizontal sectional view taken along a horizontal plane through the center of one of the filter containers forming a part of the filter system of the invention.

FIG. 6 is a sectional view taken along line 6—6 of FIG. 5.

FIG. 7 is a sectional view taken along line 7—7 of FIG. 5.

FIG. 8 is a detailed side elevation view showing a portion of one of the filter housings of the invention, and showing the portion of the drive mechanism for the nozzle subassembly as it is disposed on the side of the filter housing. The filter racks located inside the filter housing are shown in dashed lines, as are the nozzles which are provided for washing filters carried on the filter racks disposed inside the filter housing.

FIG. 9 is a view similar to FIG. 8 but illustrating an alternate position of the filter racks and nozzles disposed inside the filter housing.

FIG. 10 is a schematic illustration of the in-feed exhaust duct and parts of the gas by-pass pipes which form a position of the filtering system of the invention.

FIG. 11 is a schematic illustration of parts of a modified embodiment of the invention.

DETAILED DESCRIPTION OF A PREFERRED EMBODIMENT OF THE INVENTION

Referring initially to FIG. 1, the filtering system of the invention includes an in-feed exhaust duct 10 which is illustrated as a typical cylindrical, vertically projecting exhaust duct or stack, such as the exhaust stack from a sawdust burning boiler. The system may be accommodated to substantially any type of stack or exhaust pipe, either as presently constructed, or with a suitable adapter to facilitate the utilization of the several structural elements hereinafter described.

Positioned on opposite sides of the in-feed exhaust duct 10 are a pair of vat cleaner elements designated generally by reference numerals 12 and 14. Each of the vat cleaner elements 12 and 14 has a substantially cylindrical upper end portion which is interconnected by a frusto-conical bottom to a drainage pipe. The drainage pipes, designated by reference numerals 16 and 18, are associated with the respective vat cleaners 12 and 14, respectively. A track subassembly 20, which includes a pair of horizontally extending, substantially parallel tracks 22 and 24 and vertically extending supporting stanchions 26, is provided and is located so that the tracks are disposed above the vat cleaners 12 and 14 and the in-feed exhaust duct 10. The tracks 22 and 24 are interconnected at one end by a transverse frame member 28, and at the opposite end by a pair of transverse frame members 30 and 32. A pair of horizontally spaced, hydraulic cylinder supporting beams 34 and 36 are also extended between the lower sides of the tracks 22 and 24 as best illustrated in FIG. 3.

A carriage subassembly 40 includes a carriage cart, designated generally by reference numeral 42, reciprocably and rollably mounted on the tracks 22 and 24 and driven in reciprocation by a piston rod 44 which is extensible from a hydraulically or pneumatically operated cylinder 46. The cylinder 46 is mounted upon, and supported by, a plate 48 which is secured between the transverse frame members 30 and 32. The carriage cart 42 includes a horizontally extending plate 50 supported upon suitable transverse axles 52 which carry wheels or rollers 54 at the outer ends thereof. The wheels 54 are flanged so as to engage a flange portion of each of the tracks 22 and 24, and to permit the carriage cart 42 to roll on the tracks in response to the extension and retraction of the piston rod 44.

Mounted upon the carriage cart 42 by securement to the plate 48 are a pair of filter containers or housings 56 and 58. The filter housings 56 and 58 are horizontally spaced, and are substantially identically constructed. Each of the filter housings 56 and 58 includes a generally cylindrical conveyance duct 60, and further includes a filter plate chamber designated generally by reference numeral 62 secured to one side of the conveyance duct 60. Each of the filter plate chambers 62 is of generally octagonal cross-sectional configuration, and includes a door 64 which is hinged to a side plate 66 and, when closed, contacts a side plate 68. The side plates 66 and 68 are connected to, or formed integrally with, convergent side plates 70 and 72, respectively, which interconnect the side plates 66 and 68 with the respective cylindrical conveyance duct 60 (see FIG. 5). The manner in which a plurality of filter racks are disposed inside the filter housings 56 and 58, and the mechanism which is provided for pivoting the filter racks and periodically cleaning the filters carried thereon, will be subsequently described.

It will be noted in referring to FIGS. 1 and 3 that the conveyance ducts 60 of the filter housings 56 and 58 are interconnected by a brace plate 74 which extends between the upper ends of the ducts, and that the lower ends of the two conveyance ducts project through suitable openings formed in the horizontally extending plate 50 of the carriage cart 42. It will also be noted to referring to FIGS. 1 and 3 that the diameter of each of the conveyance ducts 60 is substantially equal to the diameter of the vat cleaner elements 12 and 14.

Supported at a location above and spaced vertically from the in-feed exhaust duct 10 is a discharge exhaust duct 80. The discharge exhaust duct 80 is supported at this location by a pair of supporting channel beams 82 and 84 which are disposed on opposite sides of the track subassembly 20, and which have their lower ends bent inwardly and secured by welding or other suitable means to the underside of the two opposed parallel tracks 22 and 24. The upper ends of the supporting channel beams 82 and 84 are welded or otherwise suitably secured to the outer side of the discharge exhaust duct 80 as shown in FIGS. 1 and 2. For the purpose of by-passing stack gases from the in-feed exhaust duct 10 to the discharge exhaust duct 80 at one time during the operation of the system, a pair of gas bypass pipes 85 and 87 are interconnected between the in-feed exhaust duct 10 and the discharge exhaust duct 80 as shown in FIGS. 1 and 2.

In order to detachably and automatically interconnect the several gas conveying subassemblies of the apparatus of the invention to each other during the operation of the apparatus, a plurality of pneumatically or hydraulically interconnected coupling subassemblies 86 and 88 are provided. The hydraulic coupling subassembly 86 functions to interconnect the vat cleaner elements 12 and 14 to the respective conveyance ducts 60 of the filter housings 56 and 58 during different phases of the operation of the apparatus, and also to interconnect these conveyance ducts, in alternating sequence, with the in-feed exhaust duct 10. The coupling subassembly 86 includes a vat cleaner drop over collar 90 which has an inner peripheral wall 90a diametrically dimensioned to fit inside the cylindrical vat cleaner element 12, and an outer peripheral wall 90b which is diametrically dimensioned to pass outside the wall of the cylindrical vat cleaner element. The walls 90a and 90b are joined at their upper edges to an outwardly flaring lip 90c which diverges outwardly to facilitate upward movement of the drop over collar into coupling engagement with the cylindrical lower end of the conveyance duct 60 of the filter housing 56.

Drop over collars 92 and 94, which are constructed identically to the drop over collar 90, and are slidably positioned at the upper ends of the in-feed exhaust duct 10 and the vat cleaner element 14, respectively, are also provided, and similarly function for the purpose of coupling the in-feed exhaust duct and the vat cleaner element 14 to the lower end of one of the conveyance ducts 60 of the two filter housings 56 and 58 at varying times during operation of the apparatus as hereinafter described.

For the purpose of shifting or elevating the drop over collars 90, 92 and 94 during the operation of the apparatus, an actuating system is provided which includes a pair of hydraulic or pneumatic cylinders 96 connected to the lower side of the supporting beams 34 and 36, and each having a piston rod 98 projecting therefrom for reciprocation from, and into, the respective cylinder. The piston rods 98 are connected at their lower ends to a pair of internally threaded coupling sleeves 100, and such coupling sleeves receive the threaded ends of a pair of oppositely extending connecting rods 102 and 104 as shown in FIG. 4.

Each of the connecting rods 102 is secured at its outer end to a lifting yoke 106 which extends concentrically around a major portion of the outer side of the respective drop over collar 90 or 94 as shown in FIGS. 1, 3 and 4. A plurality of circumferentially spaced studs 108, which project radially outwardly from the respective drop over collar 90 or 94, function to interconnect the lifting yoke 106 to the respective drop over collar as shown in FIG. 4. The ends of the rods 104 are secured to opposite sides of a lifter ring 110 which extends concentrically around the drop over collar 92 slidably mounted on the upper end of the in-feed exhaust duct 10. The lifter ring 110 is secured to the collar 92 by means of a plurality of radially extending studs 112.

It will be perceived in referring to FIGS. 1, 3 and 4 that at such times as the pneumatic cylinders 96 are actuated to retract the piston rods 98 into the cylinders, the drop over collars 90, 92 and 94 will be elevated by sliding movement on their respective vat cleaner elements 12 and 14 and in-feed exhaust duct 10. Such vertical movement will couple the collars to either of the filter housings 56 or 58 which may be located thereabove to establish communication between the respective filter housings and the respective vat cleaner element 12 or 14 or the in-feed exhaust duct 10.

The coupling subassembly 88 includes a double-acting pneumatic or hydraulic cylinder 114 which is mounted by a suitable bracket 116 on the outer side of the discharge exhaust duct 80, and further includes a downwardly extending piston rod 118 which can be reciprocated when the cylinder 114 is actuated. At its lower end, the piston rod 118 is connected to a short connecting rod 120 which connects the piston rod to one side of a semicircular depressing yoke 122 which projects concentrically around the outer side of the discharge exhaust duct 80, and has its ends connected to collar rods 124 projecting downwardly therefrom. The depressing yoke 122 is pivotally secured to the outer side of the discharge exhaust duct 80 by means of journals which journal the outer ends of a pair of pivot pins 126 (see FIG. 3). The lower ends of the collar rods 124 are pivotally connected to the outer side of a slidable coupling collar 128. The slidable coupling collar 128 includes an internal sleeve of smaller diameter than the discharge exhaust duct 80, and an outwardly flaring lip 128b secured to the sleeve 128a and projecting downwardly therefrom for effecting coupling engagement with the open upper end of one of the conveyance ducts 60 of the filter housings 56 and 58 during operation of the apparatus.

It may be pointed out that hydraulic or pneumatic cylinders 96 which function in the hydraulic coupling subassembly 86 and the hydraulic cylinder 114 which functions in the coupling subassembly 88, are preferably pneumatically interconnected and supplied with power fluid from a suitable source so as to be able to function in a double-acting fashion in accordance with principles well understood in the art.

Each of the filter housings 56 and 58 contains a plurality of vertically spaced filter racks 130, 132, 134 and 136. The filter racks 130, 132 and 134 are identically constructed, and each of the filter racks, including the filter rack 136, includes spaced, upper and lower peripheral flange plates which define a track within which the respective filter elements, hereinafter described, are slidably supported. Thus, as shown in FIGS. 5 and 7, the filter rack 130, which is of typical construction, includes two pairs of opposed side flange plates 140, 142 and 144, 146 which are joined by two pairs of angle flange plates 148, 150 and 152, 154 to a pair of semicircular back plates 156 and 158.

At the side of each of the filter racks 130, 132 and 134 which is adjacent the door 64 of the respective filter housing 56 or 58, each filter rack includes spaced pairs of track plates 160, 162 and 164, 166 and 168, 170 which are interconnected to form an angulation complementary in configuration to the cross-section of the respective door. These track plate pairs are not included as a part of the filter rack 136 for a reason which will be hereinafter explained. The flange plate pairs 140 and 142 are interconnected at their outer side edges by a web plate 174. Similarly, the flange plate pairs 144 and 146 are interconnected at their outer side edges by a web plate 176. In like fashion, web plates 178, 179 and 180 interconnect the outer side edges of the angle plate pairs 148, 150 and 152, 154, and the back plates 156 and 158, respectively.

Each of the filter racks 130–136, respectively, slidingly receives a filter of porous, gas-permeable material having the shape shown in FIGS. 5, 6 and 7, and designated by reference numeral 181. The filters 181 are disposed slidably in the several filter racks 130—136 so as to be arrayed in horizontally offset, vertically spaced relation as best illustrated in FIGS. 8 and 9. The described and illustrated arrangement and configuration of the filters 181 within the several filter racks 130–136 results in the stack gases being passed through the filter housings in a sinuous or undulating movement as a result of the horizontally staggered or offset relationship of the several filters.

Each of the filter racks 130–136 is pivotally supported within the respective filter housing 56 or 58 for pivotation about a horizontal axis so that each filter rack can be pivoted from a horizontally extending position, as shown in FIG. 8, to a position at which it is inclined to the horizontal, as shown in FIG. 9. The pivotal support for each of the filter racks is provided by a pair of pivot pins 182 and 184 which are extended out through the opposed side plates 66 and 68 of the respective filter housing 56 or 58. For the purpose of effecting the pivotal movement of the filter racks 130–136 and the filters supported thereby, each filter rack has a second pair of pins 186 and 188 which project outwardly from the web plates 174 and 176 thereof, and through slots formed in the opposed side plates 66 and 68 of the respective filter housings 56 and 58.

The outer ends of the pins 186 and 188 are secured to a pair of opposed, vertically extending rack bars 190 and 192 which are slidingly and sealingly mounted against the opposed side plates 66 and 68 of the filter housings 56 and 58. A pair of L-shaped brackets 194 and 196 retain the rack bars 190 and 192 in position on the side plates 66 and 68 of the housing and facilitate sliding movement of the rack bars 190 and 192. Each of the rack bars 190 and 192 is provided with a plurality of toothed segments along one side edge thereof as shown in the bar 190 at 190a, 190b, 190c, 190d and 190e in FIGS. 8 and 9.

A plurality of nozzle subassemblies, designated generally by reference numeral 200, are provided in association with the filter racks and filters, and there is one of the nozzle subassemblies associated with, and positioned over, each filter rack. Each of the nozzle subassemblies 200 includes a pair of opposed, jet-type nozzles 202 which are interconnected through an elongated nozzle bar conduit 204 which has small, downwardly and upwardly opening orifices or perforations spaced therealong. The conduit 204 has a T-fitting 206 in the central portion thereof, and the T-fitting has a ball-type terminus which is journaled in a spindle sleeve 208. The spindle sleeve 208 and ball of the T-fitting 206 form the joint which permits the nozzle bar 204 and the nozzles 202 carried thereby to be rotated about an axis extended downwardly from the spindle sleeve 208. The spindle sleeve 208 is secured to the outer end of a pipe 210 which projects through a sealed opening in the side plate 68 of the respective filter container 56 or 58 and carries, at the outer end thereof, a circular gear segment 212 which is keyed to the pipe 210 for rotation about the longitudinal axis of the pipe for a reason hereinafter described. It should be pointed out that the pipe 210 is journaled in a suitable sealing-type journal at that location where the pipe passes through the side plate 68 of the respective filter container 56 or 58, and is free to rotate in this journal about its longitudinal axis.

The several circular gear segments 212 carry gear teeth along one side thereof in a position to mesh with or engage the toothed segments 190a–190e and 192a–192e on the rack bars 190 and 192. The circular gear segments 212 are thus spaced vertically above each other in the manner illustrated in FIGS. 8 and 9. The pipes 210 project through the gear segments and are connected at their outer ends to a water manifold pipe 216 which supplies water or other suitable cleaning fluid to the pipes 210 and ultimately to the nozzles 202 in a manner hereinafter described.

For the purpose of actuating the nozzle subassemblies 200 to change the inclination of the elongated conduits 204 to the horizontal, and concurrently change the inclination of the filter racks 130–136, and the filters 181 carried thereby with respect to the horizontal, an elongated actuating rod 220 is rigidly connected to the opposite side of the lowermost circular gear segment 212 from that side which carries the gear teeth which engage the respective toothed segment on the respective rack bar 190 and 192. Stated differently, one of the actuating rods 220 is respectively associated with each of the two filter containers 56 and 58, and with the filter racks, filters and spray nozzle subassemblies 200 contained therein, and functions to change the attitude of the nozzle subassemblies, filter racks and filters at certain times during the operation of the apparatus as hereinafter described. The opposite end of each actuating rod 220 from that which is secured to one side of the circular gear segments 212 is connected to the lower outer end of a piston rod 222. Each piston rod 222 is extensible from a pneumatic of hydraulic cylinder 224 which has its base end pivotally secured to one side of the cylindrical conveyance duct 60 of the respective filter container 56 or 58 with which it is associated. Thus, each cylinder 224 is free to pivot about a horizontal axis during actuation of its associated actuating rod 220 in a manner and for a purpose hereinafter described.

A suitable source (not shown) of power fluid (air or hydraulic fluid) is supplied to the cylinders 224, and such source can be the same source as that used for supplying the cylinders 46, 96 and 114, hereinbefore described. A source of cleaning solvent, such as water, is also provided and directs the cleaning solvent through a suitable flexible conduit 230 which is provided with sufficient slack to accommodate the movement of the carriage cart 42 and the filter containers 56 and 58 carried thereon at certain times during operation of the apparatus as hereinafter described. The flexible conduit 230 communicates through a T-fitting 232 with water supply pipes 234 and 236 which are connected through control valves 238 and 240, respectively, to the respective water manifold pipes 216 associated with the two filter containers 56 and 58.

A schematic illustration of the gaseous flow path through the in-feed exhaust duct 10 and the gas bypass pipes 85 and 87 is presented in FIG. 10. Thus, the in-feed exhaust duct 10, which is supplied with hot polluted stack gases by a force draft fan or other suitable mechanism (not shown) carries the drop over collar 92 at the upper end thereof, and, between the location of the drop over collar and that point where the gas bypass pipes 85 and 87 branch outwardly and away from the in-feed exhaust duct, carries a switching gate or damper element 250.

The switching gate 250 is a disk-shaped plate having pivot pins 252 mounted at opposite points on its periphery, and on a diametric axis of the switching gate, for supporting the switching gate within the in-feed exhaust duct 10. The switching gate can be pivoted between a vertically extending position as shown in full lines in FIG. 10, and a horizontally extending blocking position as shown in dashed lines in that Figure. Each of the gas bypass pipes 85 and 87 is provided with a gravity-actuated closure plate 254 which is hinged at one edge thereof to the upper side of the respective gas bypass pipe, and, when in the closed position, as illustrated in full lines, bears at its other side against a stop stud 256 secured to the internal wall of the bottom side of the respective bypass pipe.

It will be perceived in referring to FIG. 10 that at a time when the switching gate 250 has been pivoted to its vertically extending position, hot stack gases can pass upwardly past the switching gate and out the upper end of the in-feed exhaust duct. When the switching gate 250 is pivoted into its horizontal blocking or damping position, the force of the upwardly moving hot stack gases forces open the gravity-actuated closure plates 254, and permits the stack gases to pass through the bypass pipes 85 and 87 and upwardly to the discharge exhaust duct 80. A fluid-actuated cylinder, such as a pneumatic cylinder or hydraulic cylinder (not shown) is provided for the purpose of opening and closing the switching gate 250 in a certain timed sequence in phase with the operational sequence of the apparatus of the invention as hereinafter described.

A modified form of the invention is illustrated in FIG. 11 of the drawings. In the modified embodiment of the invention, an adapter duct 260 is provided and is connected through a suitable bolt and flange connection 262 to the upper end of the discharge exhaust duct 80. The adapter duct 260 contains a switching gate 264 of the general type previously described, which switching gate is pivotable between an open position, shown in dashed lines, and a closed position, shown in full lines.

At one side of the adapter duct 260, the duct is provided with an opening terminating in a flange 266 which facilitates connection to an elongated dryer duct 268 having a complementary flange 270 thereon for bolted connection to the flange 266. The dryer duct 268 extends to a dryer 272 or other suitable heat exchanger where heat from the clean stack gases which have been filtered by the apparatus of the present invention can be recovered for the purpose of performing a drying function, or other thermal energy conservation procedure entailing the recovery of the waste heat from the exhaust gases.

OPERATION

The primary objective of the filtering system of the invention is to prevent polluted stack gases, or other industrially discharged gases, from entering the atmosphere in a polluted state, and to accomplish this with a minimum of down time or interruption of the industrial facility upon which the system is utilized. In operation, the power fluid cylinder 46 is operated on a timed cycle so that, at one point during the operation, which for purposes of description can be said to be the commencement of operation, the piston rod 44 is extended so as to locate the carriage subassembly 40 at the position shown in FIG. 1. In this position, the carriage cart 42 has been rolled upon the parallel tracks 22 and 24 to a location such that the filter container 56 is directly above the vat cleaner element 12, and the cylindrical conveyance duct 60 of this filter container is directly over, and in alignment with, that cylindrical portion of the vat cleaner element which forms the upper end thereof. In this status of the carriage subassembly 40, and at this stage of the operation of the system, it will further be noted that the filter container 58 is positioned over the in-feed exhaust duct 10 with the cylindrical conveyance duct 60 coaxially aligned with the cylindrical wall of the exhaust duct.

In the described status of the apparatus, the interconnected coupling subassemblies 86 and 88 are next actuated, after the positioning of the carriage subassembly 40 in the manner described, to retract the piston rods 98 into the cylinders 96 and thereby elevate the drop over collars 90, 92 and 94, so that the outwardly flaring lips carried at the upper ends of these collars pass around and sealingly engage the lower ends of the respective cylindrical conveyance ducts 60 of the respective filter containers 56 and 58. At this time, the filter container 56 is positioned for commencing the cleaning of the several filters 181 disposed therein, and carried on the filter racks 130–136. Concurrently, communication is established between the in-feed exhaust duct 10 and the interior of the filter container 58 by reason of the timed movement of the switching plate or damper element 250 contained within the upper portion of the in-feed exhaust duct 10 to its vertically extending or gas-bypassing position.

Considering initially the filtering function which is obtained by means of the filter container 58 positioned over the in-feed exhaust duct 10, the hot exhaust or stack gases passing upwardly from the in-feed exhaust duct 10, and laden with soot or other atmosphere-polluting materials, encounters the vertically spaced, horizontally offset filters 181 positioned therein upon the several filter racks 130–136. As previously explained, the particular position and location of the several filters 181 on the respective filter racks 130–136 affords a sinuous or undulating path through the filter container 58, and in traversing this path, the polluted gases necessarily undergo several reversals in the direction of movement. Moreover, the impingement of the gases on the underside of the several filters 181, and the gas permeability of these filters, allows a substantial part of the gas to pass through the filters, with concomitant removal of the solid pollutants therefrom. The filters will also effectively remove semi-solids and liquid particles which may be entrained in the stack gases passing through the filter housing 58. After the several filters 181 in the filter bank and contained upon the filter racks 130–136 have been traversed by the gases, the gases move upwardly through the discharge exhaust duct 80. The exhaust duct 80 has, at this time, been coupled to the upper end of the cylindrical conveyance duct 60 by means of the coupling collar 128 which has been lowered at the time during the operating cycle that the cylinder 114 has been previously actuated to retract the downwardly extending piston rod 118.

At the time that the filter housing 58 is performing its filtering function in the manner described, the filter housing 56 is positioned to facilitate the cleaning of the filters 181 carried therein on the filter racks 130–136. It will be noted in referring to FIGS. 5–7, and the foregoing description, that the jet-type spray nozzles 202 are positioned at the opposite ends of the elongated conduits 204 over the outer portions of each of the respective filters 181. Moreover, as has been previously explained, each of the elongated conduits 204 is provided with a plurality of small perforations therein which will permit water or other cleaning solvents to be sprayed from the perforations on the overlying and underlying surfaces of the respective filter elements. The perforations which are placed in the elongated conduit 204 preferably are grouped so that those on one side of the T-fitting 206 face generally in one direction, and those on the opposite side of the T-fitting face generally in the other direction. It will also be noted that the jet-type spray nozzles 202 face in opposite directions. The effect of this arrangement is to cause the elongated conduit 204 to be driven in rotation by the reaction from the jetting water at the time that water is delivered to the elongated conduit and the spray nozzles for the purpose of washing down and cleaning the several filters 181.

Initially during the filter cleaning operation, the filter racks 130–136 are retained in the horizontally extending position which, of course, maintains the several filters 181 in a horizontally extending position. At this time, the elongated conduits 204 of each of the nozzle subassemblies 200 are also extended horizontally above the upper surfaces of the filters. Cleaning in this mode continues by the jetting of water on the upper surface of the filter for a predetermined time period, after which the several filter racks 130–136 and the elongated conduits 204 of the several nozzle subassemblies 200 are canted or pivoted to a position in which they are inclined with respect to the horizontal. This position is shown in FIG. 7 of the drawings. At this time, the rotation of the elongated conduits 204 about the axes of rotation at the T-fittings 206 is continued, and the filters 181 shed or drain the water from the sides thereof by gravity. The water draining from the filters flows through the drainage pipe 16 at the lower end of the vat cleaner element 12.

After that portion of the cleaning cycle which is carried out with the filters 181 and filter racks 130–136 in their inclined positions has been completed, the filter racks are returned to their horizontally extending positions, and the flow of water through the pipes 210, elongated conduits 204 and spray nozzles 202 is terminated by the timed closure of the valve located in the water supply pipe 234. The timing of the closure of the valve is synchronized with the preceding cleaning phases which have been described, and also with that period of time over which the filters 181 located on the filter racks 130–136 in the filter housing 58 can be utilized before the filters become clogged to the point of inefficiency. This will be determined, of course, by the type of stack gases being filtered, and the degree of pollution thereof. Suitable automatic sequencing mechanism and control circuitry can be provided, however, for properly correlating and synchronizing the filter cleaning operation which is carried out over one of the vat cleaner elements 12 or 14 with the period of time required for the filters to become exhausted and clogged as a result of the passage of the hot stack gases therethrough during the gas filtering operation.

At a time in the cycle of operation when the filters 181 have become depleted or clogged, and thus require cleaning, the system cycles into the next phase of operation in which hydraulic fluid or air is delivered to the double-acting cylinder 46 to retract the piston rod 44. Retraction of the piston rod 44 causes the carriage cart 42 to move to the right on the parallel tracks 22 and 24. At the time that this action is started, a suitable mechanism is actuated to cause the switching gate 250 to be pivoted about the pivot pins 252 into a horizontally extending position within the in-feed exhaust duct 10 so as to block this exhaust duct, and prevent passage of the stack gas out of the upper end of the exhaust duct. This action causes the gravity-actuated closure plates 254 positioned in the two bypass pipes 85 and 87 to open up under the influence of pressure exerted by the upwardly moving gas, so that the gas can pass upwardly to the discharge exhaust duct 80 through the gas bypass pipes 85 and 87. As the piston rod 44 is retracted and the carriage cart 42 is moved to the right on the parallel tracks 22 and 24, the filter housing 58 is moved over the vat cleaner element 14 and the filter housing 56 is moved into vertical alignment with the in-feed exhaust duct 10.

The interconnected coupling subassemblies 86 and 88 are then actuated by the timed delivery of power fluid to the cylinders 96 and 114 to cause the coupling collars 90–94 and 128 to be actuated upwardly and downwardly, respectively, to place the in-feed exhaust duct 10 and the vat cleaner 14 in communication with the conveyance ducts 60 of the filter housings 56 and 58, respectively, and to cause the conveyance duct 60 of the filter housing 56 to be placed in communication with the discharge exhaust duct 80. At this time, the switching gate 250 (see FIG. 10) is caused to pivot about the pivot pins 252 to a vertically extending position so that the hot stack gases can pass upwardly through the filter housing 56, and in traversing the filter housing, undergo filtering by the filter elements 181 carried on the several filter racks 130–136.

The process of continuing to filter the hot stack gases by the use of the filters 181 in the filter housing 56, with concurrent cleaning of the filters 181 disposed in the filter housing 158, is continued, and is carried out in the manner previously described. After the filters 181 in the filter housing 58 have been restored by cleaning, the piston rod 44 is extended to cause the carriage cart 42 to move to the left on the parallel tracks 22 and 24, and the initial position, in which the filter housing 56 is aligned with the vat cleaner element 12, and the filter housing 58 is vertically aligned with the conveyance duct 60 of the filter housing 58, is reestablished. The cycle is then repeated.

It should be pointed out that at any time that it may be desired to replace or repair one of the filter elements 181, the door 64 of the respective filter housing 56 or 58 can be opened to permit the filter element to be slid outwardly and removed from its respective filter rack 130–136. This is permitted by the fact that there are no web plates which interconnect the track plate pairs 160, 162 and 164, 166 and 168, 170 located at that side of each of the filter racks which is disposed adjacent the door 64 of the respective filter housing. Replacement of the filters, after repair or with a new filter, is accomplished in the same fashion by opening the door 64 of the filter housing and sliding the new filter into the respective filter rack.

In the modified embodiment of the invention shown in FIG. 11, the operation of the system is substantially the same, except that instead of venting the purified clean exhaust gases to the atmosphere from the discharge exhaust duct 80, they are passed into the adapter duct 260, and then may optionally either be discharged to the atmosphere, or passed through the elongated dryer duct 268 to the dryer 272 where the sensible heat remaining in the exhaust gases can be extracted and used for drying or other heat transfer purposes.

Although certain preferred embodiments of the invention have been herein described in order to afford an exemplary description and illustration of basic principles to those having skill in the art, thereby enabling them to practice the invention, it will be understood that various changes and innovations in the preferred embodiments herein illustrated and described can be effected without departure from such basic principles. All changes and innovations or modifications of this type are therefore deemed to be circumscribed by the spirit and scope of the invention except as the same may be necessarily limited by the appended claims or reasonable equivalents thereof.

What is claimed is:

1. A system for filtering industrial waste gases comprising:
   an in-feed exhaust duct;
   a discharge exhaust duct positioned substantially vertically above, and spaced from, said in-feed exhaust duct;
   a pair of filter vat cleaners spaced from said in-feed exhaust duct and positioned at substantially the same horizontal level as said in-feed exhaust duct;
   a pair of horizontally spaced filtering means; and
   means for cyclically moving said horizontally spaced filtering means between a first position, at which one of said filtering means is disposed between, and in alignment with, said in-feed exhaust duct and said discharge exhaust duct and the other of said filtering means is positioned over, and in alignment with, one of said vat cleaners, and a second position, at which said other filtering means is disposed between, and in alignment with, said in-feed exhaust duct and said discharge exhaust duct, and said one filtering means is positioned over, and in alignment with, the other of said vat cleaners.

2. A system for filtering industrial waste gases as defined in claim 1 wherein each of said filtering means comprises:
   a filter housing;
   a plurality of filters movably supported in said housing; and
   means for directing a cleaning fluid against said filters.

3. A system for filtering industrial waste gases as defined in claim 2 wherein said filtering means is further characterized as including a plurality of filter racks movably mounted in said filter housing and each pivotable about a substantially horizontal axis and each slidably and detachably receiving one of said filters.

4. A system as defined in claim 2 wherein said means for directing a cleaning fluid against said filters comprises:
   a plurality of nozzle subassemblies each disposed over one of said filters; and
   means for moving portions of each of said nozzle subassemblies in relation to each of the respective filters disposed therebelow to direct said cleaning fluid against various portions of said respective filters.

5. A system for filtering industrial waste gases as defined in claim 4 and further characterized as including means for synchronizing the time of movement of said portions of the nozzle subassemblies with the movements of said filtering means.

6. A system for filtering industrial waste gases as defined in claim 1 and further characterized as including means for coupling said in-feed exhaust duct and said vat cleaners to one of said filtering means located thereabove to establish communication therebetween.

7. A system for filtering industrial waste gases as defined in claim 6 wherein said coupling means comprises:
   a drop over collar movably mounted on the upper end of each of said vat cleaners and said in-feed exhaust duct; and
   means for moving each of said drop over collars into a coupling position to interconnect and couple each of said vat cleaners and said in-feed exhaust duct with one of said filtering means when said one filtering means is disposed above, and in vertical alignment with, the respective one of said vat cleaners and said in-feed exhaust duct.

8. A system for filtering industrial waste gases as defined in claim 1 and further characterized as including means for bypassing gases from said in-feed exhaust duct to said discharge exhaust duct when said filtering means are undergoing movement between said first and second positions.

9. A system for filtering industrial waste gases as defined in claim 8 wherein said means for bypassing gases comprises:
   a switching gate in said in-feed exhaust duct and movable between a gas path opening and a gas path closing position; and
   gas bypass pipes connected to said in-feed exhaust duct at a location below said switching gate and extending upwardly to said discharge exhaust duct, said bypass pipes being positioned to facilitate positioning of said filtering means between said in-feed exhaust duct and said discharge exhaust duct.

10. A system for filtering industrial waste gases as defined in claim 1 and further characterized as including:
    track means extending over said in-feed exhaust duct and said vat cleaners; and
    a carriage subassembly rollably supporting said filtering means on said track means.

11. A system for filtering industrial waste gases as defined in claim 10 and further characterized as including means for reciprocating said carriage subassembly on said track means.

12. A system for filtering industrial waste gases as defined in claim 1 wherein said means for cyclically moving said horizontally spaced filtering means comprises:
    a fluid actuated cylinder; and
    a piston rod extensible from and retractable into said cylinder and connected to said filtering means for reciprocating said filtering means between said first and second positions.

13. A system for filtering industrial waste gases as defined in claim 1 and further characterized as including means for periodically coupling said discharge exhaust duct and said in-feed exhaust duct to one of said filter means to provide a continuous gas flow path through said exhaust ducts and filter means.

14. A system for filtering industrial waste gases as defined in claim 12 and further characterized as including:
    track means extending over said in-feed exhaust duct and said vat cleaners; and
    carriage means movably mounted on said track means and supporting said filtering means, said carriage means having said piston rod connected thereto.

15. A system for filtering industrial waste gases as defined in claim 14 wherein each of said filtering means comprises:
    a filter housing; and
    a plurality of filters removably positioned in said filter housing in vertically spaced, horizontally offset relation to each other.

16. A system for filtering industrial waste gases as defined in claim 15 wherein said filtering means is further characterized as including:
    a filter housing;
    a plurality of filters movably supported in said housing; and means for directing a cleaning fluid against said filters.

17. A system for filtering industrial waste gases as defined in claim 14 and further characterized as including means for coupling said in-feed exhaust duct and said vat cleaners to one of said filtering means located thereabove to establish communication therebetween.

18. A system for filtering industrial waste gases as defined in claim 17 wherein said coupling means comprises:
 a drop over collar movably mounted on the upper end of each of said vat cleaners and said in-feed exhaust duct; and
 means for moving each of said drop over collars into a coupling position to interconnect and couple each of said vat cleaners and said in-feed exhaust duct with one of said filtering means when said one filtering means is disposed above, and in vertical alignment with, the respective one of said vat cleaners and said in-feed exhaust duct.

19. A system for filtering industrial waste gases as defined in claim 18 wherein each of said filtering means comprises:
 a filter housing;
 a plurality of filters movably supported in said housing; and
 means for directing a cleaning fluid against said filters.

20. A system for filtering industrial waste gases as defined in claim 19 and further characterized as including means for bypassing gases from said in-feed exhaust duct to said discharge exhaust duct when said filtering means are undergoing movement between said first and second positions.

21. A system for filtering industrial waste gases as defined in claim 19 wherein said means for directing a cleaning fluid against said filters comprises:
 a plurality of nozzle subassemblies each disposed over one of said filters; and
 means for moving portions of each of said nozzle subassemblies in relation to each of the respective filters disposed therebelow to direct said cleaning fluid against various portions of said respective filters.

22. A system for filtering industrial waste gases as defined in claim 21 and further characterized as including means for synchronizing the time of movement of said portions of the nozzle subassemblies with the movements of said filtering means.

23. A system for filtering industrial waste gases as defined in claim 14 and further characterized as including means for bypassing gases from said in-feed exhaust duct to said discharge exhaust duct when said filtering means are undergoing movement between said first and second positions.

24. A system for filtering industrial waste gases as defined in claim 23 wherein said means for bypassing gases comprises:
 a switching gate in said in-feed exhaust duct and movable between a gas path opening and a gas path closing position; and
 gas bypass pipes connected to said in-feed exhaust duct at a location below said switching gate and extending upwardly to said discharge exhaust duct, said bypass pipes being positioned to facilitate positioning of said filtering means between said in-feed exhaust duct and said discharge exhaust duct.

25. A system for filtering polluted gases comprising:
 a gas exhaust duct positioned for directing and discharging gas in a vertical direction;
 filter vat cleaner means spaced from said gas exhaust duct and including discharge means for receiving and discharging a cleaning fluid;
 a plurality of horizontally spaced filter housings;
 filter means in each of said filter housings;
 filter cleaning means in each of said filter housings;
 means for periodically, and in consecutive sequence, aligning and interconnecting each of said filter housings with said gas exhaust duct while concurrently aligning and interconnecting at least one of said filter housings with said filter vat cleaner means; and
 means for synchronously activating said filter cleaning means with said aligning and interconnecting means to operate said filter cleaning means in each of said filter housings at a time when the respective filter housing is aligned and interconnected with said vat cleaner means.

26. A system for filtering polluted gases as defined in claim 25 wherein said filter cleaning means comprises:
 nozzles rotatably supported in said housing over said filter means; and
 means for supplying a cleaning fluid to said nozzles.

27. A system for filtering polluted gases as defined in claim 26 and further characterized as including means for concurrently pivoting said nozzles and said filter means about horizontal axes.

28. A system for filtering polluted gases as defined in claim 25 wherein said filter means includes:
 a plurality of vertically spaced filter racks each pivotally supported in said housing for pivotation about a horizontal axis and each including an open access side portion; and
 a plurality of gas-permeable filters each removably inserted in one of said filter racks in horizontally offset relation to each pair of adjacent filters.

29. A system for filtering polluted gases comprising:
 a source of polluted gas to be filtered;
 a plurality of horizontally spaced filter housings each adapted to receive polluted gas from said source when positioned over said source;
 a plurality of vertically spaced, horizontally offset filters removably and tiltably mounted in each of said filter housings;
 means in each of said housings for directing a cleaning fluid against each of said filters;
 a plurality of horizontally spaced vat cleaners;
 means for interconnecting said filter housings for concurrent movement; and
 means for cyclically moving each of said horizontally spaced filter housings, in alternating sequence, to positions directed vertically over, and in communication with, each of said vat cleaners and said polluted gas source.

* * * * *